United States Patent
Otsuka

[11] Patent Number: 5,887,085
[45] Date of Patent: Mar. 23, 1999

[54] IMAGE PROCESSING DEVICE

[75] Inventor: Itsuro Otsuka, Kyoto, Japan

[73] Assignee: Rohm Co., Ltd., Kyoto, Japan

[21] Appl. No.: 522,083

[22] Filed: Aug. 31, 1995

[30] Foreign Application Priority Data

Sep. 7, 1994 [JP] Japan .................................. 6-239426

[51] Int. Cl.[6] .............................. G06K 7/00; G06K 9/00; G06K 9/20; G06K 9/40
[52] U.S. Cl. .......................... 382/266; 382/252; 382/312; 382/318; 382/319; 382/323; 358/474; 358/482
[58] Field of Search ..................................... 382/252, 266, 382/274, 284, 312, 318, 319, 323, 260; 358/402, 406, 474, 482, 483, 451; 250/201.8; 347/41; 364/551.01

[56] References Cited

U.S. PATENT DOCUMENTS

| | | | |
|---|---|---|---|
| 4,197,584 | 4/1980 | Blazek | 364/551.01 |
| 4,636,624 | 1/1987 | Ishida et al. | 250/201.8 |
| 4,860,118 | 8/1989 | Arimoto | 358/451 |
| 5,251,272 | 10/1993 | Hino et al. | 382/274 |
| 5,307,425 | 4/1994 | Otsuka | 382/252 |
| 5,384,587 | 1/1995 | Takagi et al. | 347/41 |
| 5,592,304 | 1/1997 | Udagawa et al. | 382/284 |

*Primary Examiner*—Leo H. Boudreau
*Assistant Examiner*—Daniel G. Mariam
*Attorney, Agent, or Firm*—Fay, Sharpe, Beall, Fagan, Minnich & McKee

[57] ABSTRACT

An image processing device is provided with a scanning means which performs subscanning by a pitch corresponding to a width covering a number of pixels less than the number of detectable pixels by a one dimensional image sensor by two or more pixels so as to overlap two or more line pixels. An edge emphasizing means performs an edge emphasis processing for the pixels from the second pixel to the second last pixel according to the image data obtained in response to the scanning by the scanning means.

6 Claims, 4 Drawing Sheets

$X = x - \alpha(a+b+c+d-4x)$

IMAGE PROCESSING DEVICE

BACKGROUND OF THE INVENTION

1. Field of the Invention

The present invention relates to an image processing device and, more specifically, relates to an improvement in an emphasis processing in a digital type copying machine, an image scanner and the like when performing an edge emphasis processing for read data.

2. Background Art

In an image scanner and the like, an original image is developed into pixels, the gray levels of the respective pixels are read as gray level signals and the read signals relating to the image are outputted such as to a laser printer through a pseudo intermediate gradient processing of binary value data. In such case or in a case when an image is inputted and outputted in a digital type copying machine an edge emphasis processing or a nonuniformity correction processing for input image data is performed in order to obtain a high quality image. The pseudo intermediate gradient processing was invented by the present inventor and was already patented as U.S. Pat. No. 5,307,425.

In an edge emphasis processing, a gray level of a certain pixel, which is obtained via individual light receiving parts or light receiving elements arranged correspondingly to respective pixels, is detected as a gray level signal (normally an analog value) and a detected value (which is normally a digital value converted from the above analog value) of the noted pixel determined in accordance with the detected value is corrected by detected values of the pixels surrounding the noted pixel. For this purpose, it is necessary to refer to detected values of the pixels on scanning lines immediately before and after the current scanning line. Accordingly, a memory is necessary which stores these detected values (digital values) of the respective pixels as pixel data.

On the other hand, in these days a plurality of main scanning lines are simultaneously scanned by a single main scanning operation. In such instance, the pixel data (detected values of the respective pixels) on the scanning lines immediately before and after the current scanning line are normally stored simultaneously in the memory. However, for the edge emphasis of the last line among the plurality of main scanning lines, pixel data of the first line obtained in the subsequent main scanning operation is necessary, therefore the edge emphasis processing for the last line is required to wait until the pixel data of the subsequent first line is obtained. Further, for the edge emphasis of the first line in the subsequent main scanning operation the pixel data of the last line in the immediately before main scanning operation is necessitated, therefore the pixel data of the last line have to be preserved. For this reason, in such a scanner that reads image data by scanning a plurality of main scanning lines simultaneously, a memory is necessary which stores detected values of the pixels covering the last one line and the subsequent first one line.

FIG. 5 and FIGS. 6(a) and 6(b) are diagrams for explaining relationships between scanning operation and edge emphasis processing when a plurality of main scanning lines are simultaneously scanned by a single scanning operation.

As shown in FIG. 5, a scanner is provided with a CCD sensor 11 for 128 pixels (with regard to pixels see FIG. 6(a)) located in vertical direction (in the subscanning direction). Through a single scanning operation a main scanning covering 128 lines is simultaneously performed with a vertical width covering 128 pixels. After one main scanning operation has completed, the scanner moves in vertical direction (in the subscanning direction) by the width covering 128 pixels for the subsequent main scanning operation within return time in the retrace interval (see FIG. 5).

In an edge emphasis processing, for example as shown in FIG. 6(b), an edge emphasized value X is calculated with reference to the detected values a, b, c and d of the surrounding 4 pixels and according to an equation, for example, $X = x - \alpha(a+b+c+d-4x)$, wherein $\alpha$ is a predetermined coefficient.

Therefore, for the pixels on the joint portions in the subscannings the detected data of pixels obtained in the subsequent main scanning operation or in the immediately before main scanning operation are necessitated.

In FIG. 6(a), the blocks indicated by numerals 1 are first pixels and the blocks indicated by numerals 128 are last pixels for the CCD sensor 11, and for the above indicated reason as a memory for storing the detected values of these pixels, a line memory covering two line pixels along the main scanning direction (pixels on a main scanning line are defined as one line pixels) is incorporated in a device. Accordingly, at the moment when the detected values (pixel data) of the respective pixels are inputted which are obtained from the CCD sensor 11 at the subsequent scanning point (respective measurement points of the CCD sensor 11 along the main scanning direction), the one line before pixel corresponding to the pixel on the scanning point immediately before the subsequent scanning point (the detected value of the pixel is stored in the memory) is noted and the edge emphasis processing is performed for the noted pixel while referring to the detected values of the previous two line pixels stored in the line memory.

Namely, in order to edge emphasize the last line pixels and the first line pixels in the subsequent scanning operation, data on the scanning lines before and after the concerned line are necessitated. Therefore, data covering one scanning line have to be stored in the memory for the respective last and first line pixels, such that a line memory having a storage capacity covering at least two scanning line data has to be provided. The longer the width in the main scanning direction, the larger the capacity of the line memory. Further, the line memory has to be provided separate from an image memory, therefore the control thereof is also performed independent from that for the image memory. Accordingly, a separate control circuit therefor is necessitated.

In this type of scanners, the line memory is assembled into the CCD sensor so as to keep a required performance and to meet a required size reduction. However, when assembling the line memory, because of a limited room in the sensor portion there arise problems that the circuit assembling is difficult and the working therefor is lower. Further, due to such assembling the scanner itself becomes expensive as well as the size reduction thereof becomes difficult.

SUMMARY OF THE INVENTION

An object of the present invention is to provide an image processing device which permits an edge emphasis processing without using one line memory for an edge emphasis.

The image processing device according to the present invention, which achieves the above object and in which the arranging direction of light receiving portions or light receiving elements in an image sensor arranged in correspondence with pixels to be detected is to correspond to the subscanning direction, through the main scanning by the image sensor in the main scanning direction gray level signals of the respective pixels are obtained from the image sensor and an edge emphasis processing is performed in response to the values of the gray level signals. A scanning means performs the subscanning by a pitch corresponding to a width covering pixels of which number is less than the number of the pixels in the arranging direction covered by the light receiving portions or the light receiving elements by equal to or more than two pixels. An edge emphasizing means performs an edge emphasis processing for the second pixels to the second last pixels defined by the arranging direction based on the gray level signals obtained in response to the scanning in the main scanning direction are provided, and after completing the main scanning the subscanning is performed by the scanning means.

When equal to or more than two pixels in the subscanning direction are overlappingly scanned as explained above, the data of equal to or more than the last two pixels in the subscanning direction are obtained in the subsequent scanning operation.

For example, an overlapping scan covering two line pixels is performed and the edge emphasis processing is performed from the second line pixels in the subsequent main scanning operation, the edge emphasis processing corresponds to that for the last line pixels in the immediately before main scanning operation.

Accordingly, the edge emphasis processing for the last line pixels in the immediately before main scanning operation is obtained in the edge emphasis processing in the subsequent main scanning operation. As a result, the line memory specifically provided in the CCD portion for the edge emphasis for the joint portion pixels in subscanning direction can be eliminated.

BRIEF DESCRIPTION OF THE DRAWINGS

FIG. 6(a) and FIG. 6(b) are diagrams for explaining a general edge emphasis processing, wherein FIG. 6(a) is a diagram for explaining a general scanning operation and FIG. 6(b) is a diagram for explaining an example of edge emphasis processings.

DESCRIPTION OF THE PREFERRED EMBODIMENT

Figure 1:
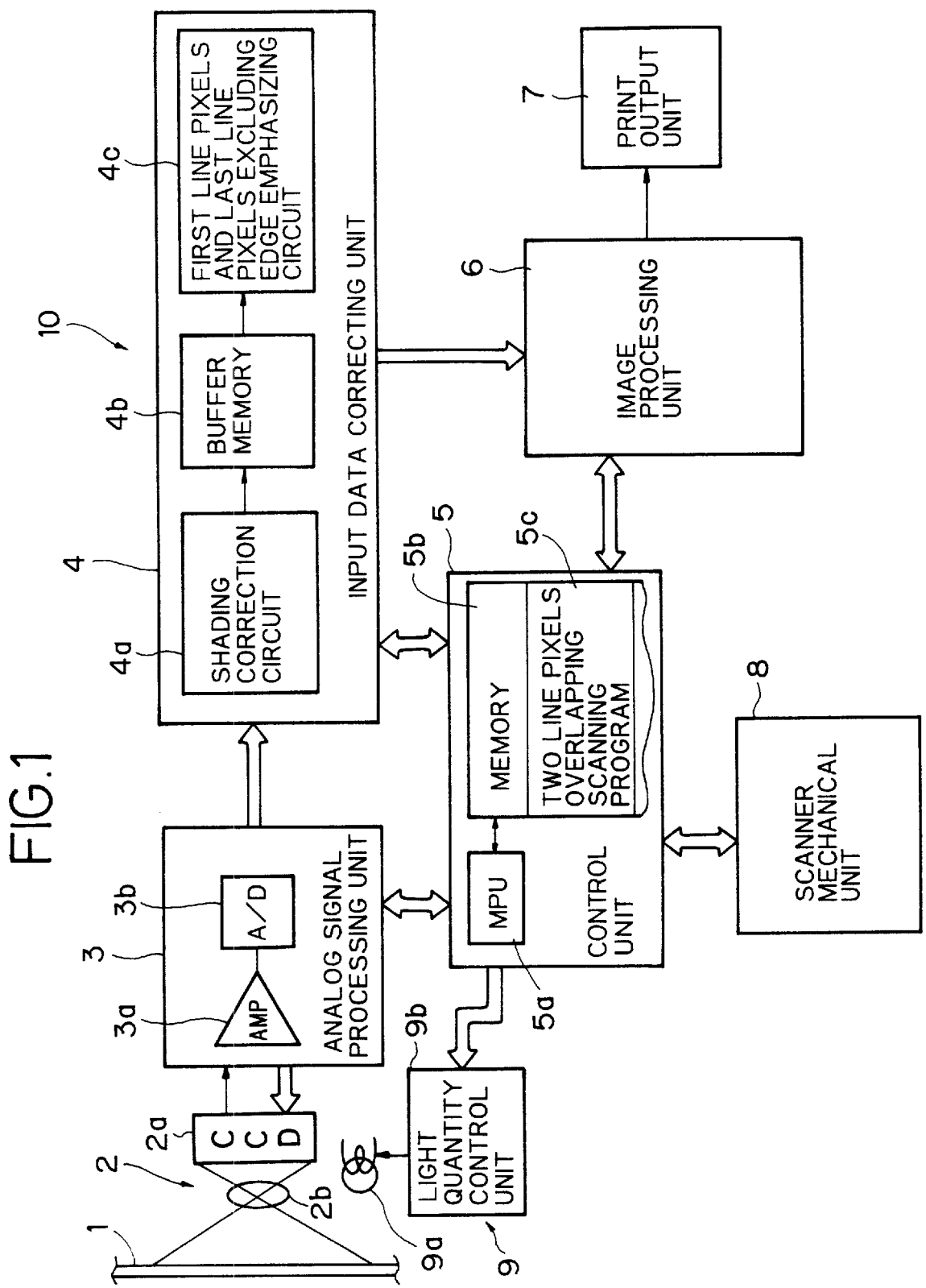
FIG. 1 is a block diagram of one embodiment of the image processing device according to the present invention.
Figure 5:
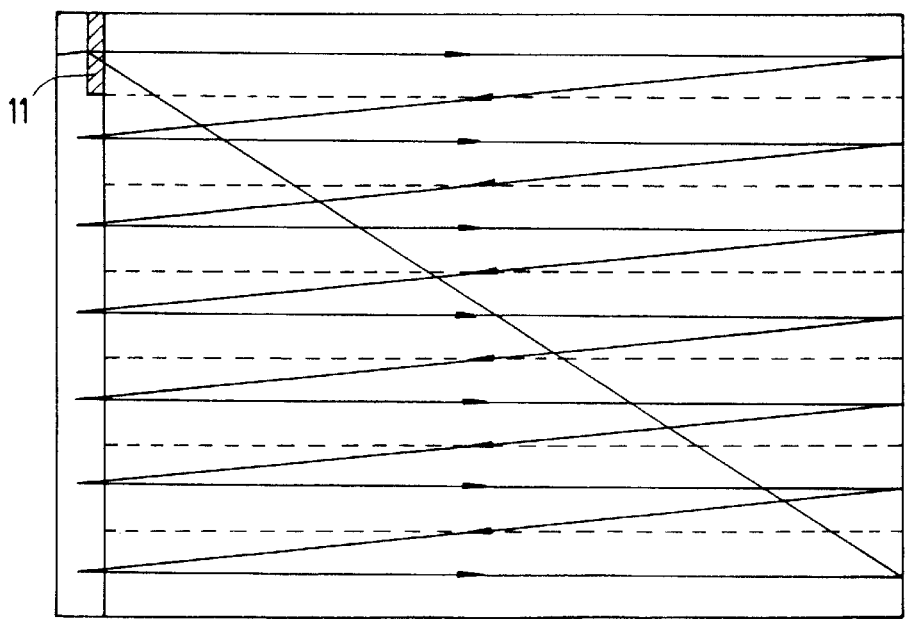
FIG. 5 is a diagram for explaining a scanning operation when a plurality of main scanning lines covered by a sensor are simultaneously scanned.

In FIG. 1, numeral 10 is an image processing device in which an original image 1 is read via a detection unit 2 and gray levels of respective pixels of the original image 1 arranged in the subscanning direction are detected in a form of gray level signals via one dimensional CCD image sensor (hereinafter called as CCD sensor) 2a. These detected signals for the first pixels to the last pixels are successively and serially sent out from the CCD sensor 2a to an analog signal processing unit 3. The CCD sensor 2a is equivalent to the CCD sensor 11 as shown in FIG. 5 and in which light receiving portions or light receiving elements covering 128 pixels in the vertical direction (in the subscanning direction) are arranged. Numeral 2b is a lens provided in the detection unit 2 and which causes to focus the image of the original image 1 onto the CCD sensor 2a.

The analog signal processing unit 3 is constituted by an amplifier (AMP) 3a, an A/D converter circuit (A/D) 3b and a CCD control circuit (not shown), reads serially the detection signals (gray level signals) of the 128 pixels from the CCD sensor 2a in response to sampling signals and control signals from a control unit 5, amplifies the same in the amplifier 3a and thereafter sends out the amplified signals to the A/D 3b. The A/D 3b converts the levels of the detected signals of the respective pixels into digital data of 256 gradations in 8 bits in response to the sampling signals from the control unit 5 and sends out the same to an input data correcting unit 4.

The input data correcting unit 4 is constituted by a shading correction circuit 4a, a buffer memory 4b and a first line pixels and last line pixels excluding edge emphasizing circuit 4c and is also controlled via signals from the control unit 5. The digital data inputted from the analog signal processing unit 3 are at first inputted into the shading correction circuit 4a in the input data correcting unit 4, wherein a processing is performed in accordance with a predetermined reference which is read in advance to thereby correct the non-uniformity thereof. The non-uniformity corrected data are sent out from the shading correction circuit 4a to the buffer memory 4b to store therein and are further sent out to the first line pixels and last line pixels excluding edge emphasizing circuit 4c. The shading correction used in the present embodiment is one generally known, therefore the explanation thereof is omitted.

The buffer memory 4b stores the non-uniformity corrected data covering two column scanning points (2 measurement points) in the main scanning direction, namely the first pixel—the 128th pixel covered by the CCD sensor 11 contained in two lines in vertical direction (256 pixels in total). In this instance, the data at one column scanning points in the main scanning direction contain those of 128 pixels corresponding to the width of the subscanning, therefore the data stored in the buffer memory 4b amounts 128 pixel×2 pieces.

The first line pixels and last line pixels excluding edge emphasizing circuit 4c excludes the edge emphasis processing for the data of the first pixels 1 (data of the first line pixels) and the data of the pixels 128 (data of the last 128th line pixels), starts the edge emphasis processing for the data of the second line pixels and ends the edge emphasis processing at the 127th pixels. Namely, although the same processing as in the conventional edge emphasis processing is performed, the processing object is limited to the pixels 2—pixels 127 and the first pixels and the last pixels are excluded from the processing. Such operation is realized, for example, when setting pixel numbers at a counter which designates the pixel numbers to be processed, the noted pixel number 2 is first set instead of setting noted pixel number 1 and the ending pixel number 127 is lastly set instead of setting ending pixel number 128.

Figure 6A:
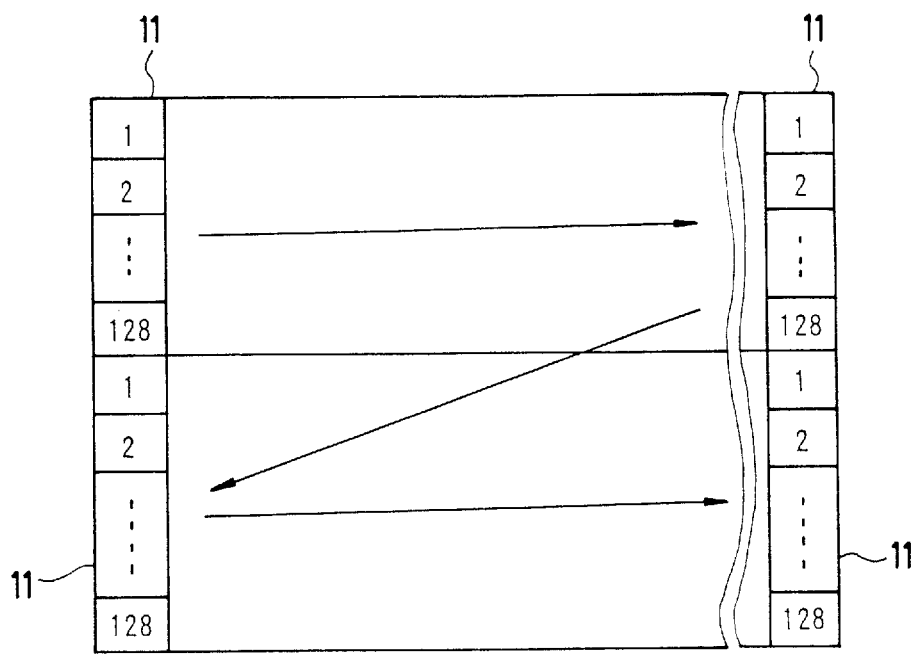
Figure 6B:
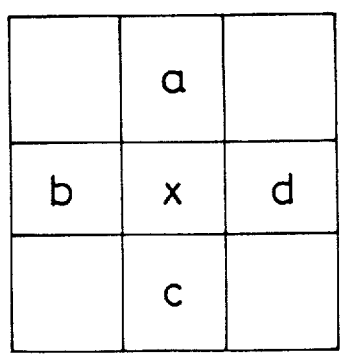

When a plurality of main scanning lines are simultaneously scanned, the edge emphasis processing is possible as shown in FIG. 6(b) if pixel data (detected values of respective pixels) covering surrounding 4 points contained in three lines including before and after thereof in the main scanning direction (continuous three line pixels in the main scanning direction) are obtained. Therefore, in the present embodiment the edge emphasis processing is performed by making use of the digital value data after the shading correction of the 2 vertical line pixels stored in the buffer memory 4b and the pixel data currently inputted from the analog signal processing unit 3 (the detected values after shading correction).

For simplifying the explanation, at first the explanation is started specifically under a condition that all of the data for the edge emphasis processing are prepared.

It is assumed that the buffer memory 4b stores the pixel data of 128 pieces detected at the first scanning points by the CCD sensor 11 during the main scanning as well as the pixel data of 128 piece detected at the subsequent scanning points. Then, it is further assumed that the CCD sensor 2a moves up to the third scanning points. At the moment when the first line pixels and last line pixels excluding edge emphasis circuit 4c has received data covering 128 pixels at the third scanning points, more precisely at the timing when the CCD sensor 2a has received the data of the second pixel at the third scanning point, the up and down and right and left surrounding data with respect to the detected value x of the second pixel at the second scanning point immediately before by one scanning point, in that the surrounding data a, b, c and d as shown in FIG. 6(b), are prepared. Namely, at this moment the data a, b, and c among these surounding data are stored in the buffer memory 4b and the data of the second line pixel at the third scanning point has been received as data d.

Under this condition, while noting the second line pixel at the second scanning point which is immediately before the current third scanning points, the first line pixels and last line pixels excluding edge emphasis processing circuit 4c starts the edge emphasis processing for the noted pixels with reference to the data of 128 pixels×2 pieces (respective data a, b, and c among these data) stored in the buffer memory 4d. The manner of the processing which is explained previously is as follows, in that a value X of the noted second pixel is calculated through an arithmetic processing of, for example, $X = x - \alpha(a+b+c+d-4x)$ based on the detected value x and the calculated value X is sent out to an image processing unit 6 as the edge emphasized value of the second line pixel.

At the moment when the above edge emphasis processing is completed the surrounding data b at the scanning point immediately before the edge emphasized pixel as shown in FIG. 6(b) becomes unnecessary, therefore the data x at the second scanning point in the buffer memory 4b is stored at the position of the data b at the first scanning point. Further, the data x serves as a reference pixel equivalent to the pixel having value a during the subsequent edge emphasis processing for the third pixel, therefore the data x is preserved as it is and is used for the subsequent edge emphasis processing of the third pixel.

The data at the third scanning points which are currently being received from the CCD sensor 2a are temporarily stored at a temporary register (not shown) in the first line pixels and last line pixels excluding edge emphasizing circuit 4c. Then, at the timing when the data of the third pixel at the third scanning point is received from the CCD sensor 2a, the third pixel at the second scanning point is noted and the same processing as explained above is repeated for the newly noted pixel. At the moment when the edge emphasis processing of the pixel at the third is completed the data x is unnecessary, therefore the data of the second pixel at the third scanning point received immediately before from the CCD sensor 2a and stored in the temporary register is stored at the position occupied by the data x. Thereby, the data of third pixel at the third scanning point which is currently being received from the CCD sensor 2a is stored at the temporary register.

Every time when pixel data at the third scanning points are received, the edge emphasis processing on the data from below the third pixel to the 127th pixel at second scanning points, the data updating of the second scanning points and the temporary data storage of the third scanning point are successively performed.

In the above case, the edge emphasis processing is performed from the second scanning pants. When performing the edge emphasis processing on the pixels at the first scanning points, at the moment when the second pixel data at the second scanning point is received from the CCD sensor 2a, the pixel of the second line at the first scanning point is noted which is immediately before the second pixel received of the data. For the pixels at the first scanning points the edge emphasis processing is started from the second pixel at the first scanning point with reference to the data of 128 pixels×1 pieces stored at the buffer memory 4b.

In this instance, among respective surrounding pixel data required for the edge emphasis processing data corresponding to the surrounding data b as shown in FIG. 6(b) is lacking which is immediately before the first scanning points, therefore, using predetermined data values set for the data immediately before the first scanning points the edge emphasis processing is performed. Further, for the sake of convenience the edge emphasis processing for the pixels at the second scanning points is at first explained, however in actual practice the edge emphasis processing is performed first for the pixels at the first scanning points.

Figure 2:
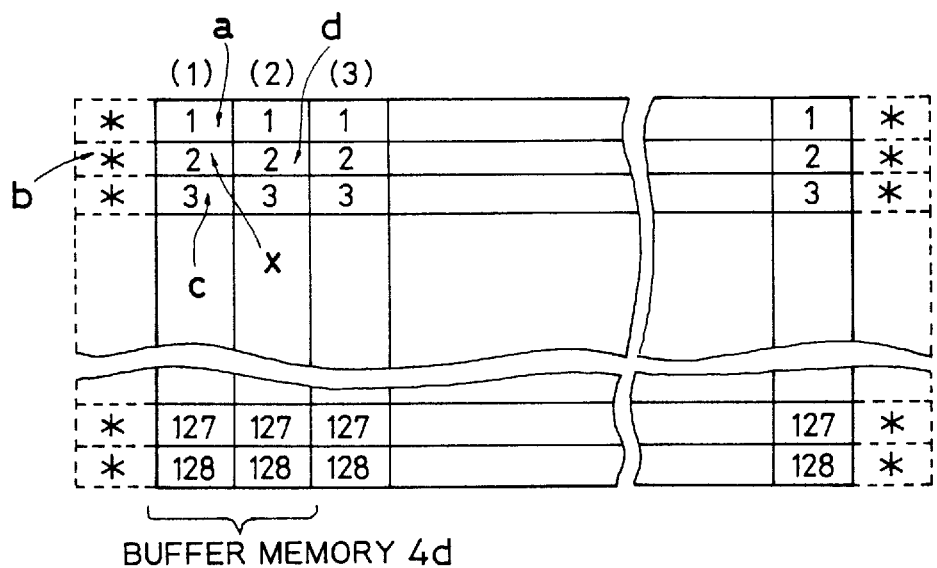
FIG. 2 is a diagram for explaining a relationship between edge emphasis processing and pixels in the embodiment.

Such actual processing is explained specifically with reference to FIG. 2 wherein the vertical block indicated by * represents positions using predetermined data, the vertical block indicated by (1) represents the first scanning points during the first scanning and the vertical block indicated by (2) represents the subsequent second scanning points. In the buffer memory 4b the data of 128 pixels indicated in the vertical block (1) are stored and the first line pixels and last line pixels excluding edge emphasizing circuit 4c receives successively the data of 128 pixels from pixel 1 to pixel 128 in the vertical block (2). At the moment when the data of the second pixel at the vertical block (2) is received, the data of the second pixel at the vertical block (1) is assumed as x and then the edge emphasis processing for the data x is performed according to the above mentioned equation using a, b, c, d and x, and such processing is ended at the pixel 127. Thereafter, at the moment when the data of pixel 2 in the vertical block (3) is received, the relationship between a, b, c, d and x is shifted rightward and the object x of the edge emphasis processing is moved to the second pixel in the vertical block (2). Since the data in the vertical blocks (1) and (2) are already stored in the buffer memory 4b, the edge emphasis processing for from the second pixel to the 127th pixel in the vertical block (2) which now constitute the objects for the edge emphasis processing is performed by using the stored pixel data in the vertical blocks (1) and (2) and the pixel data in the vertical block (3) now receiving with reference to the relationship as shown in FIG. 6(b). Further, after the last measurement points at which the main scanning operation is ended, no input data are received, therefore in the like manner as for the 128 pixels in the vertical block (1), a vertical block indicated by * containing predetermined data values is added after the block for the last measurement points and the edge emphasis processing for the pixels at the last measurement points is performed by making use of the predetermined data values in the added vertical block.

In the manner as explained above, the data contents of 128 pixels×2 pieces stored in the buffer memory 4b is successively updated and the edge emphasis processing is successively performed for the pixels from the second pixel to the 127th pixel with reference to these updated data.

The respective edge emphasized data are successively sent out to the image processing unit 6 wherein a binary coding processing such as a pseudo intermediate gradient processing is performed and the processed data are sent out to a print output unit 7.

Figure 3:
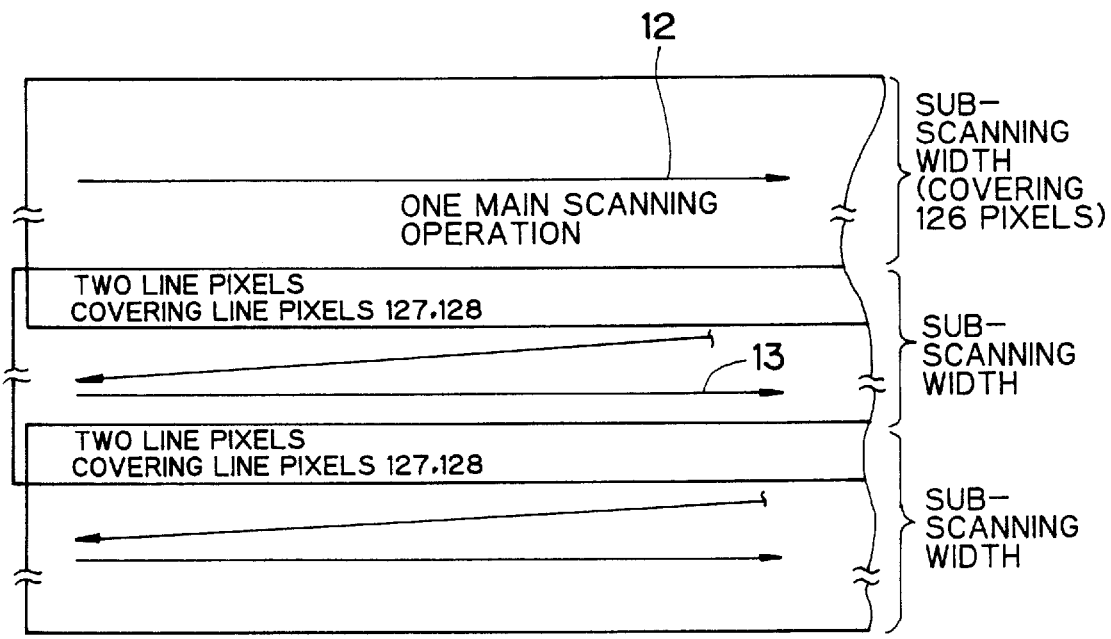
FIG. 3 is a diagram for explaining a scanning operation in the embodiment.
Figure 4:
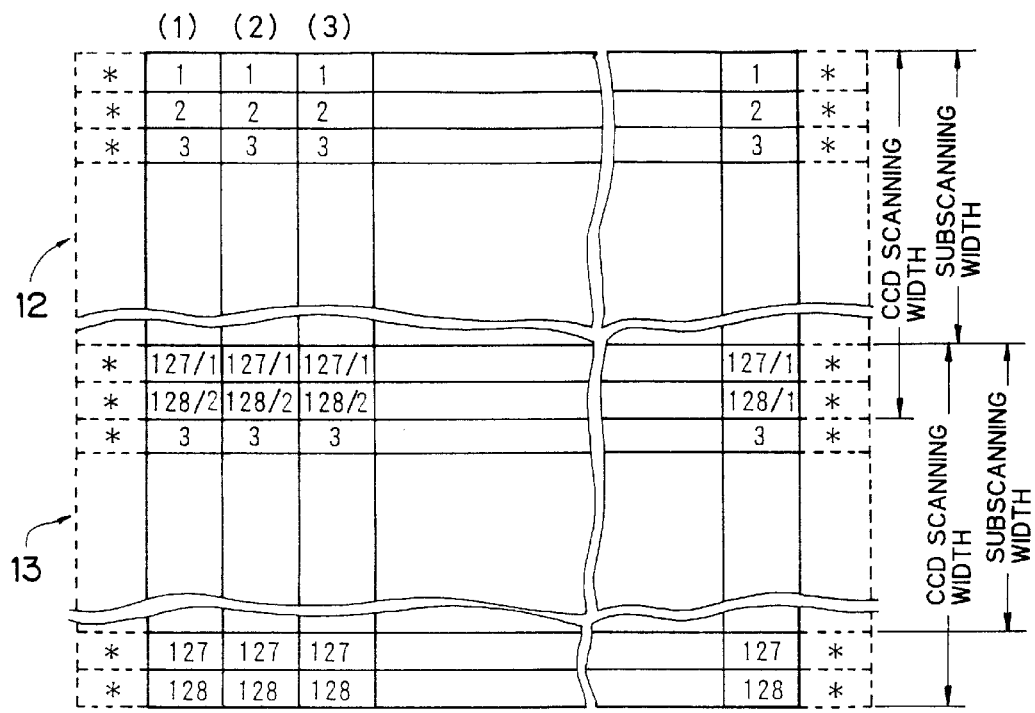
FIG. 4 is a diagram for explaining a relationship between overlapping processing of two line pixels and edge emphasis processing thereof in the embodiment.

Numeral 8 is a scanner mechanism unit controlled by the control unit 5 and constitutes a scanner together with the detection unit 2. The pitch in the subscanning direction of the scanner mechanical unit 8 is set smaller by a width corresponding to two pixels than the number of pixels arranged in the subscanning direction and covered by the CCD sensor 11 with the respect to the detection unit 2 as shown in FIG. 3 and FIG. 4, namely a pitch corresponding to a width of 126 pixels is set for the scanner mechanism unit 8 and an overlapping subscanning covering two line pixels is performed.

The control unit 5 is constituted by a MPU 5a and a memory 5b, and is provided with a two line pixels overlapping scanning program 5c which performs an overlapping scanning of two line pixels.

In the two pixels overlapping scanning program 5c the subscanning width is set to cover 126 pixels in contrast to the conventional subscanning width covering 128 pixels, however other than the difference in the subscanning width the two pixels overlapping scanning program 5c is substantially the same as the conventional scanning program. Namely, when returning after completing the last one line in one main scanning operation shown in FIG. 5, the returning position of the retrace line is simply shifted upward by a distance corresponding to two pixels, thereby the first two pixels for the subsequent scanning by the CCD sensor 11 are overlapped.

Numeral 9 is an exposure control unit which is constituted by a light source 9a and light quantity control unit 9b which controls the quantity of light of the light source 9a.

FIGS. 3 and 4 are diagrams for explaining the edge emphasis processing when the two line pixels overlapping scanning is performed by the scanner mechanism 8.

Numeral 12 indicates a first main scanning operation and numeral 13 indicates the subsequent main scanning operation. In this subsequent main scanning operation after the first main scanning operation two line pixels components are overlappingly scanned, therefore the last two pixels 127 and 128 in the first main scanning operation corresponds to the first and second pixels 1 and 2 in the subsequent main scanning operation and the last pixels 128 in the previous main scanning operation 12 are taken up as the object of the edge emphasis processing for the second pixels 2 in the subsequent main scanning operation. Accordingly, all of the pixels except for the first line pixels in the first main scanning are taken up as the object of the edge emphasis processing and no line memories for the joint processing and for the joint itself are necessitated.

In the embodiment of the present invention, two pixels are overlappingly scanned in the subscanning direction, it is of cource possible to be overlappingly scanned of equal to or more than three pixels depending on the scanning in the subscanning accuracy in the subscanning direction. Further, depending on arithmetic operation used for the edge emphasis processing it is also possible to make use of further more surrounding data while performing the overlapping scanning of equal to or more than three pixels.

In the above, the one dimensional image sensor is explained, however the image sensor is not limited thereto, in that with a two dimensional image sensor detection signals corresponding to respective pixels can be taken out one-dimensionally along the subscanning direction.

I claim:

1. An image processing device in which the arranging direction of light receiving portions or light receiving elements in an image sensor arranged in correspondence with pixels to be detected is determined to correspond to the subscanning direction, through the main scanning by said image sensor in the main scanning direction, gray level signals of the respective pixels are obtained from said image sensor and an edge emphasis processing is performed in response to the values of the gray level signals obtained, the image processing device comprising:

a scanning means which performs the subscanning by a pitch corresponding to a width covering line pixels of which number is less than the number of the line pixels covered by either the light receiving portions or light receiving elements in said image sensor in the arranging direction by two or more pixels; and an edge emphasizing means which has a buffer memory to store therein data corresponding to the gray level signals from the image sensor obtained in said subscanning direction and performs an edge emphasis processing from the second pixel to the second to last pixel excluding a first pixel and a last pixel defined by the arranging direction based on data from said buffer memory in response to the scanning in the main scanning direction, and wherein after completing the main scanning the subscanning is performed by said scanning means.

2. An image processing device according to claim 1, wherein said edge emphasizing means performs the edge emphasis processing for the respective pixels in the subscanning direction at the first scanning point and the last scanning point in the main scanning by making use of predetermined set data values.

3. An image processing device according to claim 1, further comprising an A/D converter circuit, a shading correction circuit and a buffer memory, wherein said image sensor is a one dimensional CCD sensor, the gray level signals are converted into digital values by said A/D converter circuit, the converted digital values are shading-corrected by said shading correction circuit and stored in said buffer memory, with regard to the gray level signals of the respective pixels arranged in the subscanning direction each shading corrected digital value of the pixels at the scanning point which locates prior to the current scanning point in the main scanning by two pixels and each shading corrected digital value of the pixels at the scanning point which locates prior to the current scanning point in the main scanning by one pixel are stored in said buffer memory, and said edge emphasizing means performs the edge emphasis processing upon receipt of the shading-corrected digital value of a certain pixel at the current scanning point from said shading correction circuit and with reference to the digital values stored in said buffer memory for the pixel prior to the certain pixel in the main scanning by one pixel.

4. An image processing device according to claim 3, wherein said CCD sensor is one which outputs successively and serially the gray level signals for the respective pixels from the first pixel to the last pixel, said A/D converter circuit is one which successively converts the gray level signals, and at the moment when received of the shading corrected digital value of the certain pixel at the current scanning point said edge emphasizing means performs an arithmetic operation for the edge emphasis for the pixel prior to the certain pixel in the main scanning by one pixel and with reference to the shading corrected digital values for the surrounding pixels therearound.

5. An image processing device according to claim 4, wherein said edge emphasizing means is an edge emphasizing circuit which edge-emphasizes the respective pixels excluding the first pixel and the last pixel which are detected by said CCD sensor.

6. An image processing device according to claim 5, wherein the number of pixels arranged in the subscanning direction which are to be scanned by said one dimensional CCD sensor is 128 pixels and said edge emphasizing means performs the edge emphasis processing for the pixels from the second pixel to the 127th pixel.

* * * * *